Jan. 8, 1924.

A. H. KING ET AL

STARTING MECHANISM

Filed Dec. 21, 1922

1,480,397

INVENTORS
Alexander H. King,
Harold H. Young.
Verner G. Rathermund
ATTORNEY

Patented Jan. 8, 1924.

1,480,397

UNITED STATES PATENT OFFICE.

ALEXANDER H. KING AND HAROLD H. YOUNG, OF KEYPORT, NEW JERSEY, ASSIGNORS TO AEROMARINE PLANE & MOTOR COMPANY, A CORPORATION OF NEW YORK.

STARTING MECHANISM.

Application filed December 21, 1922. Serial No. 608,158.

*To all whom it may concern:*

Be it known that we, ALEXANDER H. KING and HAROLD H. YOUNG, both citizens of the United States, and both residents of Keyport, in the county of Monmouth and State of New Jersey, have invented certain new and useful Improvements in Starting Mechanism, of which the following is a specification, reference being had to the accompanying drawings, forming part of this specification.

This invention relates to devices of general application wherever it is desired to transmit movement from a driving to a driven member and the invention specifically relates to an improvement in starting mechanism as used in conjunction with an internal combustion engine.

The present embodiment and its specific applications as herewith illustrated, constitutes a starting device by which the engine is started or "turned over" manually, although it is obvious that the embodiment as shown and described can be made applicable to driving connections other than those manually operated by only slight modifications therein and without departing from the spirit of the invention.

In the present disclosure there is featured a shaft or driving member that is axially shifted into driving engagement with an engine shaft upon rotation of the crank handle and upon further rotation of the handle after the meshing has been effected the member will be rotated to drive the engine shaft. Automatic demeshing will occur when the speed of the engine shaft overruns that of the driving member.

Like many of the devices of the prior art the meshing feature of the present invention may conveniently be used in conjunction with other means such as a screw thread or the axial reactions from spiral or other gears tending to effect a meshing of the driven elements. In the past to insure the functioning of such devices, relative rotation between the meshing member and the operating parts has been found necessary, and to this end both inertia and frictional restraint of the meshing means have been used. In the present invention, however, there is featured a meshing means which is intended to be adequate for producing a meshing of the parts without any assistance from other means such as the above.

The present invention provides frictional restraining means for producing the initial mesh whereby the rotation of the meshing member alone will be limited and which shall impose no frictional restraint to the axial or meshing movement. The frictional devices of the prior art impose friction in both directions which is a source of uncertain action.

It will be understood that the action of a worm upon a worm wheel due to the angle of the helix and the resultant friction created thereby tends to move the worm wheel axially and for this reason the crank handle and the associated worm are preferably arranged in this instance to be rotated in a clockwise direction so as not to oppose the axial movement produced by the meshing means featured in this invention.

One of the objects of this invention is to provide a suitable mechanism of few parts and of simple construction for producing an efficacious automatic meshing movement as for engaging the drive shaft of an engine or the like.

Another object of the invention is to provide a mechanism for the purpose specified that is simple and compact and in which the driving member is shifted into effective driving relation with the driven member and rotation of the same effected without resorting to a complex mechanism to attain the desired result.

A further object of this invention is to provide a meshing means which will be adaptable to a large diameter meshing member with the object of allowing this meshing member to be bored out to relatively large size in order to pass a drive shaft whereby an engine accessory which can be conveniently mounted on the starter casing can be driven from the engine independently of the meshing or rotational movement of the starter mechanism. This is of advantage in that many engines at present in use have only one point whereat a hand crank can be applied, and this point is frequently occupied by a fuel pump or other engine accessory. It is accordingly one of the objects of this invention to provide a geared hand crank which will apply to such engines without interfering with the installation of a fuel pump or similar engine driven accessory.

Various other objects and advantages of the invention will be in part obvious from an inspection of the accompanying drawings and a careful consideration of the following particular description and claims of one form of mechanism embodying our invention.

In the drawings:—

Figure 1:
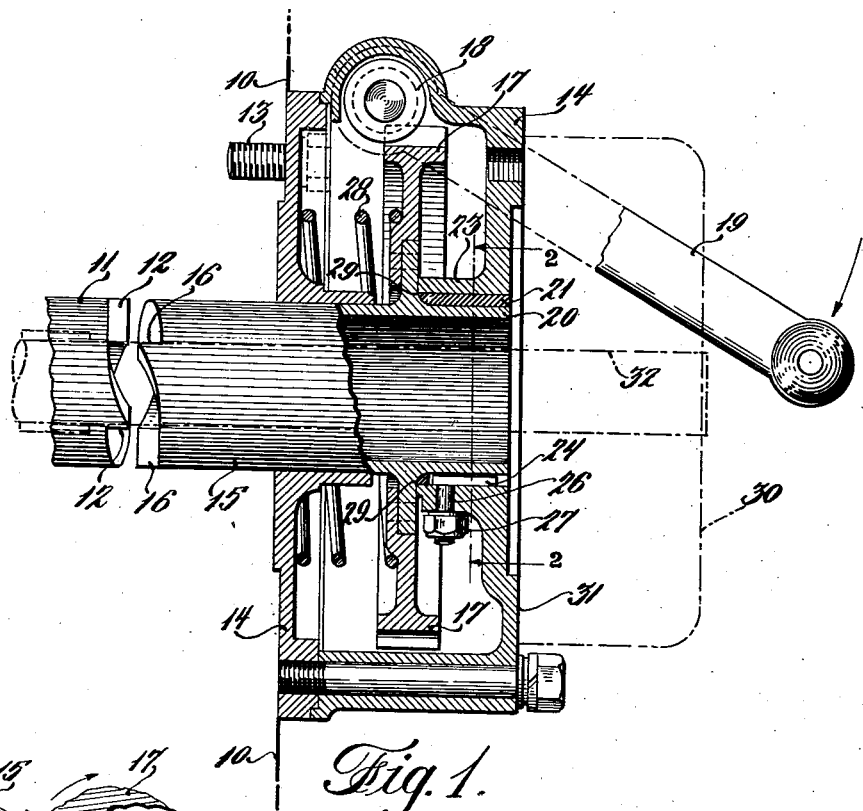
Figure 1 is a vertical section taken approximately at the center, showing a preferred embodiment of our invention as applied to an internal combustion engine of the type usually found in aeroplane motive power construction.
Figure 3:
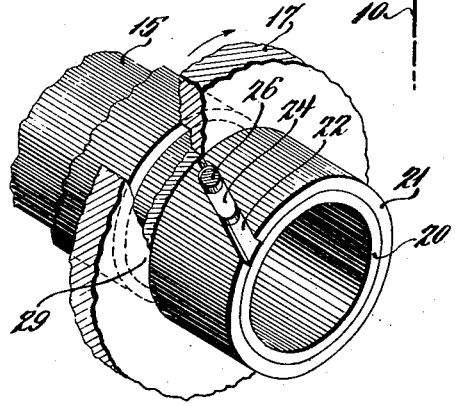
Figure 3 is a fragmentary perspective showing the principal elements of our invention.
Figure 2:
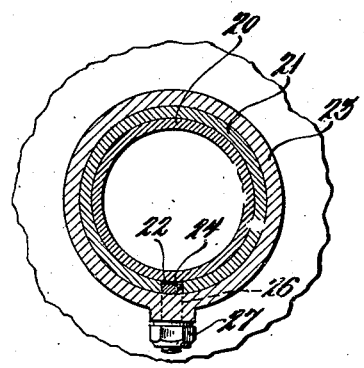
Figure 2 is a fragmentary section taken on the line 2—2 of Fig. 1, looking in the direction as indicated by the arrows.

In the present instance 10 designates a portion of a conventional form of internal combustion engine, 11 the drive shaft thereof having jaws 12. To the engine 10 there is secured in any suitable manner as by screws 13 a housing 14. Journalled within the housing 14 and axially aligned with the shaft 11 is a stub shaft 15, having jaws 16 and a worm wheel 17. The shaft 15 is disposed within said housing in a manner so as to permit of it and its associated worm wheel being axially shifted to bring the jaws 16 into driving engagement with the jaws 12 of the shaft 11, as will be more fully described hereinafter.

In the upper part of the housing there is journalled a worm 18 meshing with the worm wheel and having a crank handle 19 attached thereto by which in this instance the device is manually operated.

Upon the end 20 of the shaft 15 there is mounted in a manner so as to frictionally engage the same, a split cylindrical friction member 21, the bore of said member having been constructed of slightly lesser diameter than the exterior of the shaft 15 so as to tightly embrace the same when positioned thereon, an angular or helical slot 22 is provided in the friction member, said slot being advantageously disposed at approximately 30 degrees to the axis thereof. The friction member 21 is slidably mounted in a bearing 23 and restrained against rotation therein by a key 24 slidably disposed within the slot 22 and securely held to the bearing 23 by a screw threaded stud 26 integral with the key which is secured by the nut 27. A compression spring 28 is provided to normally maintain the shaft 15 in an out-of-mesh position.

With reference to Fig. 1 there is diagrammatically shown in broken lines an accessory 30 such as a fuel pump which may be conveniently attached to the face 31 of the housing 14, and which previously may have occupied the space on the engine 10 now used for the housing 14, the face 31 of the housing being a replica of that portion of the engine to which the housing is attached. The shaft 15 is bored out as shown in the drawings to permit of a drive shaft 32 passing therethrough and connecting with the shaft 11 for the purpose of operating said accessory.

In operation and first considering the elements in their normal position as shown in Fig. 1, the rotation of the worm wheel 17 is effected by means of the worm 18 when the handle 19 on the end thereof is operated in a clockwise direction, as the worm wheel and its associated shaft 15 start to rotate, and on account of the frictional contact between the shaft and the sleeve 21, this member will also tend to rotate and the angular slot 22 therein will then press against the key 24 and produce endwise motion of the friction member 21 which motion is communicated to the shaft 15, by the endwise contact of the friction member 21 against the shoulder 29. This movement of the shaft will continue until the maximum movement has been accomplished or until the jaws 12 and 16 of the shafts 11 and 15 have been brought into operative driving relation. Axial movement now being no longer possible the shaft will overcome the friction of the member 21 and continue to rotate as long as the handle is being operated.

In the above described manner the engine will be "turned over" or started and when the rotational speed of the engine thus started begins to exceed or overruns that of the starting mechanism the shaft 15 will be forced out of meshing engagement with the shaft 11 due to the construction of the jaws as shown in Fig. 1. The spring 28 will prevent accidental remeshing which might result due to vibration or other causes. The worm gear in the present instance is non-locking, inasmuch as the helix of the worm is constructed at an angle steep enough to permit of it being driven by the worm wheel in the event of a back fire in the engine, and a safety crank may be used in place of the one shown.

Variations may be resorted to within the scope of the invention and portions of the improvements may be used without others whilst not departing from the spirit of the invention.

Having thus described our invention, we claim:—

1. A starter arranged to co-act with a rotatable engine member provided with engaging means, said starter including a shaft having means to engage the engine member and mounted for rotation in a manner so as to permit of axial movement to effect an engagement with the engine member, means comprising an angularly guided friction member adapted to effect said axial movement.

2. In a device for starting engines and the like, the combination of a driving shaft contracting, frictional means thereon, means adapted to cooperate with said frictional means to axially move the shaft into engagement with an engine shaft.

3. In an engine starter, the combination of a bearing, an axially shiftable shaft supported in said bearing, a gear on the shaft, means for driving said gear, contracting frictional means on said shaft adapted to cause an axial movement of the shaft and to be axially shifted therewith when the gear is rotated, said means also adapted to permit a rotational movement of the shaft when the axial movement has been completed and other means whereby the elements may be maintained in a normal inoperative position.

4. An engine starter comprising in combination, an axially shiftable shaft having jaws thereon, a bearing in which the shaft is supported, a gear on the shaft, means for driving said gear, a cylindrical member frictionally engaging the shaft, said cylindrical member having an angular slot, a key fixed in the bearing and adapted to engage said slot in a manner so as to cause the shaft to be axially shifted on rotation of the gear, said frictional engagement being adapted to permit a rotation of the shaft when its axial movement has been completed.

5. Means for automatically producing an end movement in a meshing member upon the rotation thereof, comprising, means in frictional rotational contact with the meshing member and having an angular slot, a fixed means cooperating with said angular slot whereby axial movement of the member is brought about.

6. An engine starter comprising in combination, a driving means, a bearing, a member mounted in the bearing and adapted to be axially shifted to engage an engine shaft for the purpose of rotating the same, and helically guided frictional means for producing an initial limited axial movement of the member and to permit a subsequent rotational movement thereof when the driving means is operated.

7. An automatic mesh device, comprisng a member to be driven, a driving member mounted for axial movement to engage and disengage said member, contracting means frictionally engaging the driving member said means comprising a helical guide, and a fixed key coacting with the helical guide whereby the driving means is moved into engaged position upon the initial rotation of the driving member.

8. An engine starter comprising a member to be driven, driving means mounted for axial movement into and out of mesh with said member, a meshing device mounted on said driving means with frictional restraint to rotation thereon, said meshing device having a helical slot, and a fixed key coacting with said helical slot whereby meshing is automatically produced upon rotation of the driving means.

9. An automatic mesh device comprising a member to be driven, a driving means to be meshed therewith, meshing means mounted with frictional restraint to rotation upon the driving means and helical guiding means associated with said frictional meshing means to produce an axial movement thereof.

10. An automatic clutching device comprising a member to be driven, a driving member to be automatically meshed therewith, a member mounted for frictional rotation with said driving member, a fixed key, and an angularly disposed guide coacting with said key whereby rotation of said friction member communicates axial movement to the driving member.

11. A meshing device for an engine starter including, a means to be driven, a driving means adapted to slide axially for meshing and demeshing with said driven means, a spring collar frictionally embracing said driving means, said collar provided with a helical slot and a fixed guide coacting with the helical slot for effecting the meshing action.

12. In starter mechanism, a meshing member, a frictional means thereon comprising a contracting collar so constituted as to oppose the rotation of said meshing member without offering any substantial resistance to the axial movement thereof.

13. In starter mechanism, a meshing member, a cylindrical portion thereof, a spring ring frictionally engaging said cylindrical portion and helically guided so as to tend to produce end motion of said meshing means upon rotation thereof.

14. An automatic mesh device, having a journal, a contracting spring sleeve frictionally mounted thereon, a bearing supporting said sleeve and means for guiding the sleeve for spiral movement within said bearing.

15. In an automatic meshing device, a means to be moved into meshed position, a meshing means mounted for frictional rotation upon, and axial movement with, the first said means and guiding means cooperating with said frictionally mounted meshing means and so organized as to substantially eliminate frictional restraint to the axial meshing movement.

16. In an engine having a starting jaw and a face concentric therewith for mounting an engine accessory, a starter adapted to be attached to said facing and having a facing adapted to mount such engine accessory, a starter jaw adapted to mesh with the aforesaid engine starting jaw, the whole so constituted as to admit of the passage through the starter jaw and its associated parts of a shaft for driving the said accessory from the engine.

17. In a starter mechanism, a meshing member, an angularly guided friction means coacting therewith and so constituted as to oppose the rotation of said member and at the same time impose an axial meshing tendency thereon.

18. A meshing device including, a member to be meshed, a meshing member, means for driving the meshing member wherefrom an axial force in the meshing direction is imposed on the meshing member when a resistance to the rotation thereof is imposed and angularly guided frictional means adapted to yieldably resist said rotation but not to resist said axial movement.

19. An automatic mesh device including, a mesh member mounted for axial movement into meshed position under the influence of axial reactions resulting from the driving load angularly guided, frictional means adapted to impose sufficient load on the mesh means to cause said meshing action, said friction means being so constituted as not to impose frictional restraint to the axial movement set forth.

20. In an engine starting mechanism, the combination of a housing secured to an engine, a shaft mounted therein for axial and rotational movement, means on said shaft to engage an engine member, a gear on the shaft, a worm to drive the gear, a sleeve member having an angular guide, said sleeve adapted to frictionally engage the shaft, a key fixed relatively to said housing and coacting with said angular guide to effect an axial movement of the shaft so as to engage the engine member when the gear is rotated, said sleeve adapted to permit rotation of the shaft subsequent to said axial movement, means to move the shaft to a disengaged position when the engine has started, and a spring means tending to maintain the shaft in a normally inoperative position.

21. In an engine starting mechanism, the combination of a housing, a hollow shaft mounted in the housing for axial and rotational movement, one way clutch jaws on the shaft to engage an engine member, a gear secured to said shaft, a worm to drive the gear, a contracting friction member engaging the shaft, a means fixed relatively to said housing adapted to coact with the friction member to move the shaft axially into engagement with the engine member when the gear is rotated, said friction member adapted to permit rotational movement of the shaft when the axial movement has been completed, means comprising the clutch jaws whereby the shaft is moved to a disengaged position when the engine has started, and a spring means tending to maintain the shaft in a normally inoperative position.

Signed at Keyport in the county of Monmouth and State of New Jersey this 20th day of December A. D. 1922.

ALEXANDER H. KING.
HAROLD H. YOUNG.